United States Patent
Liu et al.

(10) Patent No.: US 9,680,551 B2
(45) Date of Patent: Jun. 13, 2017

(54) METHOD OF DETERMINING TWO-STAGE CODEBOOK SET APPLICABLE TO 4TX CROSS-POLARIZED ANTENNA CONFIGURATION

(71) Applicant: Alcatel Lucent, Boulogne Billancourt (FR)

(72) Inventors: Hao Liu, Shanghai (CN); Lu Wu, Shanghai (CN); Min Zhang, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/761,736

(22) PCT Filed: Jan. 13, 2014

(86) PCT No.: PCT/IB2014/000113
§ 371 (c)(1),
(2) Date: Jul. 17, 2015

(87) PCT Pub. No.: WO2014/111807
PCT Pub. Date: Jul. 24, 2014

(65) Prior Publication Data
US 2015/0358066 A1 Dec. 10, 2015

(30) Foreign Application Priority Data
Jan. 18, 2013 (CN) .......................... 2013 1 0020354

(51) Int. Cl.
*H04B 7/06* (2006.01)
*H04B 7/10* (2017.01)
(Continued)

(52) U.S. Cl.
CPC ......... *H04B 7/0634* (2013.01); *H04B 7/0417* (2013.01); *H04B 7/0452* (2013.01);
(Continued)

(58) Field of Classification Search
CPC .. H04B 7/0469; H04B 7/0634; H04B 7/0639; H04B 7/0456; H04B 7/0641; H04L 25/03898
See application file for complete search history.

(56) References Cited

U.S. PATENT DOCUMENTS

2011/0249712 A1* 10/2011 Hammarwall ....... H04B 7/0634
375/220
2011/0274188 A1* 11/2011 Sayana ................ H04B 7/0639
375/260

(Continued)

OTHER PUBLICATIONS

Tan Shuang, Tommi Koivisto, Helka-Liina Maattanen, Kari Pietikainen, Timo Roman and Mihai Enescu, "Design and Evaluation of LTE-Advanced Double Codebook", Renesas Mobile Corporation, Aalto University, IEEE, May 2011.*

(Continued)

*Primary Examiner* — Aristocratis Fotakis
(74) *Attorney, Agent, or Firm* — Fay Sharpe, LLP (57) ABSTRACT

The invention provides a solution of designing a two-stage codebook set applicable to 4Tx cross-polarized antenna configuration and a method of determining a codebook in a multi-input multi-output communication system based upon the designed two-stage codebook set applicable to 4Tx cross-polarized antenna configuration. The first stage codebook relates long-term/wideband channel information and is based on DFT vectors, whereas the second stage codebook relates to short-term/narrowband channel information and is base on selecting columns of the first stage codebook and providing inter-polarization phase information.

15 Claims, 2 Drawing Sheets

(51) Int. Cl.
    *H04B 7/04*      (2017.01)
    *H04B 7/0452*    (2017.01)
    *H04B 7/0417*    (2017.01)

(52) U.S. Cl.
    CPC .......... *H04B 7/065* (2013.01); *H04B 7/0639* (2013.01); *H04B 7/10* (2013.01)

(56) References Cited

U.S. PATENT DOCUMENTS

| | | | |
|---|---|---|---|
| 2012/0314590 A1 | 12/2012 | Choudhury et al. | |
| 2013/0114654 A1* | 5/2013 | Gomadam | H04B 7/0634 375/219 |
| 2013/0215987 A1* | 8/2013 | Lee | H04B 7/0478 375/267 |
| 2014/0192916 A1* | 7/2014 | Gomadam | H04B 7/0469 375/267 |
| 2014/0226702 A1* | 8/2014 | Onggosanusi | H04B 7/0469 375/219 |
| 2014/0254514 A1* | 9/2014 | Mobasher | H04B 7/0486 370/329 |
| 2015/0215023 A1* | 7/2015 | Thurfjell | H04B 7/046 375/295 |

OTHER PUBLICATIONS

R1-105017, "Further performance evaluation for CSI feedback enhancement proposals", Alcatel-Lucent, Spain, Aug. 23-Aug. 27, 2010.*
Lu Wu et al., "Codebook Design for LTE—A Downlink System," Vehicular Technology Conference, IEEE, 5 pages, XP032029477, Sep. 5, 2011.
Alcatel-Lucent Shanghai Bell et al., "Further evaluation on CSI feedback enhancement for x-pol antenna configurations in Scenarios A and C," $3^{rd}$ Generation Partnership Project (3GPP), 3GPP TSG-RAN WG1 #67, R1-114059, 4 pages, XP050562224, San Francisco, USA, Nov. 14-18, 2011.
International Search Report for PCT/IB2014/000113 dated Jul. 27, 2014.

* cited by examiner

METHOD OF DETERMINING TWO-STAGE CODEBOOK SET APPLICABLE TO 4TX CROSS-POLARIZED ANTENNA CONFIGURATION

FIELD OF THE INVENTION

The present disclosure relates to wireless communications and particularly to a method of designing a two-stage codebook set applicable to 4Tx cross-polarized antenna configuration in a Multi-Input Multi-Output (MIMO) wireless communication system and a method of determining a codebook from the two-stage codebook set.

BACKGROUND OF THE INVENTION

A Multi-User Multi-Input Multi-Output (MU-MIMO) system can achieve a full multiplexing gain and a significant throughput improvement by means of linear beamforming precoding at a transmitter. The accuracy of channel information acquisition has a significant influence on the gain of the MU-MIMO system in Frequency Division Duplex (FDD) configuration.

For the MU-MIMO system, codebook feedback is a technology to realize channel information acquisition and user scheduling. However codebook design adaptability and its granularity have become great challenges and bottlenecks in the MU-MIMO application in the FDD system. For example, a current Rel.10 4Tx codebook is not suitable for 4Tx cross-polarized antenna configuration, which restricts an efficient application of MU-MIMO.

SUMMARY OF THE INVENTION

In view of the foregoing problem, the invention proposes a solution of designing a two-stage codebook set applicable to cross-polarized antenna configuration. The two-stage codebook set designed by the invention is applicable to a multi-input multi-output communication system in which a base station is configured with four cross-polarized transmit antennas, and a method of generating a two-stage codebook set according to an embodiment of the invention includes the steps of:

a. generating a codebook matrix V based upon a two-antenna rank-1 DFT codebook c;

b. determining the first-stage codebook set $W_1$ according to the codebook matrix V, wherein $$W_1 = \begin{bmatrix} V & 0 \\ 0 & V \end{bmatrix};$$

and c. determining the two-stage codebook set $W_2$ at least based upon a column selection vector and inter-polarization phase information.

Advantageously the step a includes:
selecting two orthogonal DFT vectors from the two-antenna rank-1 DFT codebook c to generate the codebook matrix V, wherein $$c = \frac{1}{\sqrt{2}} \begin{bmatrix} 1 & e^{j\frac{2\pi n}{N}} \end{bmatrix}^T, (n = 0, 1, \ldots, N-1) \text{ and}$$

$$V = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix}, \left(m = 0, 1, \ldots, \frac{N}{2}-1\right).$$

Advantageously the step a includes:
selecting two orthogonal DFT vectors from the two-antenna rank-1 DFT codebook c to generate a codebook matrix I, wherein $$c = \frac{1}{\sqrt{2}} \begin{bmatrix} 1 & e^{j\frac{2\pi n}{N}} \end{bmatrix}^T,$$

$(n = 0, 1, \ldots, N-1)$ and $$I = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix},$$

$\left(m = 0, 1, \ldots \frac{N}{2}-1\right);$ and
left-multiplying or right-multiplying the codebook matrix I by a diagonal matrix J to generate the codebook matrix V, wherein $$J = \begin{pmatrix} \rho & 0 \\ 0 & \sqrt{1-\rho^2} \end{pmatrix},$$

and p is quantized in the range (0, 1).

Advantageously the step a includes:
selecting a set of adjacent overlapping DFT vectors from the two-antenna rank-1 DFT codebook c to generate the codebook matrix V, wherein $$V = \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix},$$

$(m = 0, 2, 4, \ldots, N-2).$

Advantageously the step c includes:
determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\},$$

$(n = 0, 1, \ldots, N-1),$ $(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V.

Advantageously the step c includes:
determining the second set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2}\, Y_2 e^{j\frac{2\pi n}{N}} \end{bmatrix} \right\},$$

$(n = 0, 1, \ldots, N-1)$, $(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$

$(n = 0, 1, \ldots, N-1)$, $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2,
wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1).

Advantageously the step c includes:
determining the second set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2}\, Y_2 e^{j\frac{2\pi n}{N}} \end{bmatrix} \right\},$$

$(n = 0, 1, \ldots, N-1)$, $(Y_1, Y_2) \in \{(\tilde{e}_m, \tilde{e}_k)\}$, (m=1, ... 4, k=1, ... 4) for rank 1; and $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$

$(n = 0, 1, \ldots, N-1)$, $(Y_1, Y_2, Y_3, Y_4) \in \{(\tilde{e}_i, \tilde{e}_j, \tilde{e}_k, \tilde{e}_l)\}$, (i=1, ... 4, j=1, ..., 4, k=1, ... 4, l=1, ..., 4) for rank 2,
wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

Based upon a two-stage codebook set, designed by the invention, applicable to 4Tx cross-polarized antenna configuration, in an embodiment of the invention, there is provided a method of determining a codebook in a base station of a multi-input multi-output communication system, wherein the method includes the steps of:

i. determining an uplink long-term and/or broadband channel matrix according to a sounding signal from a user equipment;

ii. selecting a first codebook from a first-stage codebook set based upon the first-stage codebook set to match the uplink long-term and/or broadband channel matrix;

iii. sending index information of the first codebook to the user equipment;

iv. receiving index information of a second codebook from the user equipment;

v. selecting the second codebook from a second-stage codebook set according to the index information of the second codebook; and vi. multiplying the first codebook with the second codebook to obtain a target codebook, wherein the first-stage codebook set $W_1$ and the second-stage codebook set $W_2$ are determined by:
generating a codebook matrix V based upon a two-antenna rank-1 DFT codebook c;
determining the first-stage codebook set $W_1$ according to the codebook matrix V, wherein $$W_1 = \begin{bmatrix} V & 0 \\ 0 & V \end{bmatrix};$$

and
determining the second-stage codebook set $W_2$ at least based upon a column selection vector and inter-polarization phase information.

Advantageously the codebook matrix V is generated by any one of:
selecting two orthogonal DFT vectors from the two-antenna rank-1 DFT codebook c to generate the codebook matrix V, wherein $$c = \frac{1}{\sqrt{2}} \begin{bmatrix} 1 & e^{j\frac{2\pi n}{N}} \end{bmatrix}^T,$$

$(n = 0, 1, \ldots, N-1)$ and $$V = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix},$$

$\left(m = 0, 1, \ldots, \frac{N}{2}-1\right)$;

selecting two orthogonal DFT vectors from the two-antenna rank-1 DFT codebook c to generate a codebook matrix I, wherein $$c = \frac{1}{\sqrt{2}} \begin{bmatrix} 1 & e^{j\frac{2\pi n}{N}} \end{bmatrix}^T,$$

$(n = 0, 1, \ldots, N-1)$ and $$I = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix},$$

$\left(m = 0, 1, \ldots, \frac{N}{2}-1\right)$, and left-multiplying or right-multiplying the codebook matrix I by a diagonal matrix J to generate the codebook matrix V, wherein $$J = \begin{pmatrix} \rho & 0 \\ 0 & \sqrt{1-\rho^2} \end{pmatrix},$$

and ρ is quantized in the range (0, 1); and
selecting a set of adjacent overlapping DFT vectors from the two-antenna rank-1 DFT codebook c to generate the codebook matrix V, wherein $$V = \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix},$$

$(m = 0, 2, 4, \ldots, N-2).$

Advantageously the second-stage codebook set $W_2$ is determined by any one of:
determining the second set $W_2$ based upon the column selection vector and the inter-polarization phase information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\},$$

$(n = 0, 1, \ldots, N-1),$ $(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2,
wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V;
determining the second set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1); and
determining the second set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, . . . 4, k=1, . . . , 4) for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, . . . 4, j=1, . . . , 4, k=1, . . . , 4, l=1, . . . , 4) for rank 2,
wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

In correspondence to the foregoing embodiment, in an embodiment of the invention, there is provided a method of determining a codebook in a user equipment of a multi-input multi-output communication system, wherein the method includes the steps of:
A. receiving index information of a first codebook from a base station;
B. selecting the first codebook from a first-stage codebook set according to the index information of the first codebook;
C. determining a downlink short-term and/or narrowband channel matrix according to reference information from the base station;
D. selecting a second codebook from a second-stage codebook set based upon the first codebook to match the downlink short-term and/or narrowband channel matrix; and
E. sending index information of the second codebook to the base station and multiplying the first codebook with the second codebook to obtain a target codebook,
wherein the first-stage codebook set $W_1$ and the second-stage codebook set $W_2$ are determined by:
generating a codebook matrix V based upon a two-antenna rank-1 DFT codebook c;
determining the first-stage codebook set $W_1$ according to the codebook matrix V, wherein $$W_1 = \begin{bmatrix} V & 0 \\ 0 & V \end{bmatrix};$$

and
  determining the second-stage codebook set $W_2$ at least based upon a column selection vector and inter-polarization phase information.
  Advantageously the step D includes:
  multiplying the first codebook with each codebook in the second-stage codebook set and selecting the second codebook from the second-stage codebook set based upon a maximum capacity or minimum distance criterion.

Based upon a two-stage codebook set, designed by the invention, applicable to 4Tx cross-polarized antenna configuration, in an embodiment of the invention, there is provided a method of determining a codebook in a user equipment of a multi-input multi-output communication system, wherein the method includes the steps of:

I. determining a downlink long-term and/or broadband channel matrix according to reference information from a base station;

II. selecting a first codebook from a first-stage codebook set to match the downlink long-term and/or broadband channel matrix;

III. sending index information of the first codebook to the base station;

IV. determining a downlink short-term and/or narrowband channel matrix according to the reference information from the base station;

V. selecting a second codebook from a second-stage codebook set based upon the first codebook to match the downlink short-term and/or narrowband channel matrix; and VI. sending index information of the second codebook to the base station, and multiplying the first codebook with the second codebook to obtain a target codebook, wherein the first-stage codebook set $W_1$ and the second-stage codebook set $W_2$ are determined by:
  generating a codebook matrix V based upon a two-antenna rank-1 DFT codebook c;
  determining the first-stage codebook set $W_1$ according to the codebook matrix V, wherein $$W_1 = \begin{bmatrix} V & 0 \\ 0 & V \end{bmatrix};$$

and
  determining the second-stage codebook set $W_2$ at least based upon a column selection vector and inter-polarization phase information.

Advantageously the codebook matrix V is generated by any one of:
  selecting two orthogonal DFT vectors from the two-antenna rank-1 DFT codebook c to generate the codebook matrix V, wherein $$c = \frac{1}{\sqrt{2}}\begin{bmatrix} 1 & e^{j\frac{2\pi n}{N}} \end{bmatrix}^T, \ (n = 0, 1, \ldots, N-1)$$

and $$V = \frac{1}{\sqrt{2}}\begin{bmatrix} 1 & 1 \\ e^{j\frac{2\pi}{N}m} & e^{j\frac{2\pi}{N}(m+\frac{N}{2})} \end{bmatrix}, \ \left(m = 0, 1, \ldots, \frac{N}{2}-1\right);$$

selecting two orthogonal DFT vectors from the two-antenna rank-1 DFT codebook c to generate a codebook matrix I, wherein $$c = \frac{1}{\sqrt{2}}\begin{bmatrix} 1 & e^{j\frac{2\pi n}{N}} \end{bmatrix}^T, \ (n = 0, 1, \ldots, N-1)$$

and $$I = \frac{1}{\sqrt{2}}\begin{bmatrix} 1 & 1 \\ e^{j\frac{2\pi}{N}m} & e^{j\frac{2\pi}{N}(m+\frac{N}{2})} \end{bmatrix}, \ \left(m = 0, 1, \ldots, \frac{N}{2}-1\right),$$

and left-multiplying or right-multiplying the codebook matrix I by a diagonal matrix J to generate the codebook matrix V, wherein $$J = \begin{pmatrix} \rho & 0 \\ 0 & \sqrt{1-\rho^2} \end{pmatrix},$$

and $\rho$ is quantized in the range (0, 1); and
  selecting a set of adjacent overlapping DFT vectors from the two-antenna rank-1 DFT codebook c to generate the codebook matrix V, wherein $$V = \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix},$$

$(m = 0, 2, 4, \ldots, N-2).$

Advantageously the second-stage codebook set $W_2$ is determined by any one of:
  determining the second set $W_2$ based upon the column selection vector and the inter-polarization phase information in the formula of:

$$W_2 \in \left\{ \frac{1}{\sqrt{2}}\begin{bmatrix} \alpha Y_1 \\ \sqrt{1-\alpha^2}\, Y_2 e^{j\frac{2\pi n}{N}} \end{bmatrix} \right\}, \ (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}}\begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V;

determining the second set $W_2$ based upon the column selection vector, the inter-polarization phase information and inter-polarization amplitude information in the formula of:

$$W_2 \in \left\{ \frac{1}{\sqrt{2}}\begin{bmatrix} \alpha Y_1 \\ \sqrt{1-\alpha^2}\, Y_2 e^{j\frac{2\pi n}{N}} \end{bmatrix} \right\}, \ (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$

$(n = 0, 1, \ldots, N-1)$, $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1); and determining the second set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2}\, Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, ... 4, k=1, ..., 4) for rank 1; and $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$

$(n = 0, 1, \ldots, N-1)$, $(Y_1, Y_2, Y_3, Y_4) \in \{(\tilde{e}_i, \tilde{e}_j, \tilde{e}_k, \tilde{e}_l)\}$, (i=1, ... 4, j=1, ..., 4, k=1, ... 4, l=1, ..., 4) for rank 2, wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

Advantageously the step V includes:
multiplying the first codebook with each codebook in the second-stage codebook set and selecting the second codebook from the second-stage codebook set based upon a maximum capacity or minimum distance criterion.

In correspondence to the foregoing embodiment, in an embodiment of the invention, there is provided a method of determining a codebook in a base station of a multi-input multi-output communication system, the base station being configured with four cross-polarized transmit antennas, wherein the method includes the steps of:
receiving index information of a first codebook from a user equipment;
selecting the first codebook from a first-stage codebook set according to the index information of the first codebook;
receiving index information of a second codebook from the user equipment;
selecting the second codebook from a second-stage codebook set according to the index information of the second codebook; and
multiplying the first codebook with the second codebook to obtain a target codebook,
wherein the first-stage codebook set $W_1$ and the second-stage codebook set $W_2$ are determined by:
generating a codebook matrix V based upon a two-antenna rank-1 DFT codebook c;
determining the first-stage codebook set $W_1$ according to the codebook matrix V, wherein $$W_1 = \begin{bmatrix} V & 0 \\ 0 & V \end{bmatrix};$$

and
determining the second-stage codebook set $W_2$ at least based upon a column selection vector and inter-polarization phase information.

The respective aspects of the invention will become more apparent from the following description of particular embodiments.

BRIEF DESCRIPTION OF DRAWINGS

The foregoing and other features of the invention will become more apparent upon review of the following detailed description of non-limiting embodiments taken with reference to the drawings in which.

Identical or like reference numerals in the drawings denote identical or like components.

DETAILED DESCRIPTION OF EMBODIMENTS

In the following we will give a detailed description of a two-stage codebook structure applicable to 4Tx cross-polarized antenna configuration.

A two-stage codebook set can be defined as follows:

$$W = W_1 W_2$$

Where $W_1$ is a first-stage codebook set and $W_2$ is a second-stage codebook set.

(1) Generation of the first-stage codebook set $W_1$ $W_1$ represents long-term and/or wideband channel properties for each antenna pair with the same polarization direction in 4Tx cross-polarized antenna configuration, as can be shown in the following block diagonal form:

$$W_1 = \begin{bmatrix} V & 0 \\ 0 & V \end{bmatrix}$$

V is composed of two eigenvectors for 2Tx MIMO channels with the same polarization direction in 4Tx cross-polarized antenna configuration, that is, $V=[v_1\ v_2]$ with the dimension of 2×2.

There are two methods to acquire eigenvector information for the matrix V. One is downlink signaling indication and the other is uplink CSI feedback.

In the first option, wideband eigenvectors, such as $v_1$ and $v_2$, and a wideband eigenvalue ρ, can be achieved by a base station (eNB) according to the reciprocity of uplink and downlink covariance matrixes for each antenna pair with the same polarization direction. Then the eNB notifies a User Equipment (UE) of the calibrated eigenvectors and eigenvalue through downlink signaling to achieve completely the same $W_1$ information for the eNB side and the UE side. The eigenvectors and the eigenvalue in $W_1$ have a slow variation property based on the reciprocity of the uplink and downlink covariance matrixes and can be semi-statically indicated by the eNB through downlink signaling transmission in a long periodicity, which can occupy a downlink transmission overhead as low as possible. Thus in this option, a larger codebook set can be used to quantize the covariance matrixes or their eigenvectors to improve W1 accuracy.

In the second option, V can be defined as a two-column orthogonal 2Tx DFT codebook and can be selected and reported by the UE from a predefined codebook set.

For example, a two-antenna DFT codebook with rank 1 can be designed as follows:

$$c = \frac{1}{\sqrt{2}} \begin{bmatrix} 1 & e^{j\frac{2\pi n}{N}} \end{bmatrix}^T, (n = 0, 1, \ldots, N-1)$$

In an example, two orthogonal DFT vectors can be selected from the foregoing codebook c to form the following codebook matrix V:

$$V = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix}, \left(m = 0, 1, \ldots, \frac{N}{2} - 1\right);$$

Thus $W_1$ can be shown as follows:

$$W_1 \in \left\{ \begin{bmatrix} \begin{bmatrix} 1 & 1 \\ e^{j\frac{2\pi}{N}m} & e^{j\frac{2\pi}{N}(m+\frac{N}{2})} \end{bmatrix} & 0 \\ 0 & \begin{bmatrix} 1 & 1 \\ e^{j\frac{2\pi}{N}m} & e^{j\frac{2\pi}{N}(m+\frac{N}{2})} \end{bmatrix} \end{bmatrix} \right\},$$

$$\left(m = 0, 1, \ldots, \frac{N}{2} - 1\right)$$

Advantageously a non-constant modulus property can be taken into account to reflect inter-polarization amplitude information, and hereupon the element ρ reflecting the non-constant modulus property can be introduced to V. Specifically, firstly two orthogonal DFT vectors can be selected from the foregoing codebook c to form the following codebook matrix I:

$$I = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix}, \left(m = 0, 1, \ldots, \frac{N}{2} - 1\right)$$

Then the foregoing codebook matrix I is left-multiplied or right-multiplied by a diagonal matrix $$J = \begin{pmatrix} \rho & 0 \\ 0 & \sqrt{1-\rho^2} \end{pmatrix}$$

to generate the codebook matrix V:

$$V = \frac{1}{\sqrt{2}} \begin{bmatrix} \rho & \rho \\ \sqrt{1-\rho}\, e^{j\frac{2\pi}{N}m} & \sqrt{1-\rho}\, e^{j\frac{2\pi}{N}(m+\frac{N}{2})} \end{bmatrix},$$

$\left(m = 0, 1, \ldots, \frac{N}{2} - 1\right)$ (Left multiplication); and $$V = \frac{1}{\sqrt{2}} \begin{bmatrix} \rho & \rho \\ \sqrt{1-\rho}\, e^{j\frac{2\pi}{N}m} & \sqrt{1-\rho}\, e^{j\frac{2\pi}{N}(m+\frac{N}{2})} \end{bmatrix},$$

$\left(m = 0, 1, \ldots, \frac{N}{2} - 1\right)$ (Right multiplication).

Where ρ is quantized in the range (0, 1).

In another example, a plurality of consecutive DFT vectors can be selected from the foregoing codebook c to form the codebook matrix V. For example, a set of adjacent overlapped DFT vectors can be selected from the foregoing codebook c to form the codebook matrix V:

$$V = \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix},$$

$(m = 0, 2, 4, \ldots, N-2)$

Thus $W_1$ can be shown as follows:

$$W_1 \in \left\{ \begin{bmatrix} \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix} & 0 \\ 0 & \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix} \end{bmatrix} \right\},$$

$(m = 0, 2, 4, \ldots, N-2)$

As can be appreciated, the size of the codebook set $W_1$ in the foregoing first option can be set larger than the size of the codebook set $W_1$ in the foregoing second option.

Advantageously the eNB can signal semi-statically the selection of one of the foregoing two options in higher-layer signaling. If the selection of the first option is signaled in the higher-layer signaling, then the UE shall use $W_1$ directly according to downlink indication from the eNB; and if the selection of the second option is signaled in the higher-layer signaling, then the UE measures a downlink channel and reports $W_1$ information over an uplink feedback channel.

Otherwise, a default selection of $W_1$ may be used, such as from the latest downlink indication or uplink feedback.

In summary, the first-stage codebook set $W_1$ can be defined as follows:

For the foregoing first downlink signaling indication method:

$$W_1 = \begin{bmatrix} V & 0 \\ 0 & V \end{bmatrix} = \begin{bmatrix} [v_1 \; v_2] & 0 \\ 0 & [v_1 \; v_2] \end{bmatrix}$$

For the foregoing second uplink CSI feedback method:

In the event that V is formed of two orthogonal DFT vectors selected from the foregoing codebook c:

$$W_1 \in \left\{ \begin{bmatrix} \begin{bmatrix} 1 & 1 \\ e^{j\frac{2\pi}{N}m} & e^{j\frac{2\pi}{N}(m+\frac{N}{2})} \end{bmatrix} & 0 \\ 0 & \begin{bmatrix} 1 & 1 \\ e^{j\frac{2\pi}{N}m} & e^{j\frac{2\pi}{N}(m+\frac{N}{2})} \end{bmatrix} \end{bmatrix} \right\},$$

$$\left(m = 0, 1, \ldots, \frac{N}{2} - 1\right);$$

In the event that V is formed of a set of adjacent overlapped DFT vectors selected from the foregoing codebook c:

$$W_1 \in \left\{ \begin{bmatrix} \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix} & 0 \\ 0 & \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix} \end{bmatrix} \right\},$$

$(m = 0, 2, 4, \ldots, N-2)$

The number of feedback bits for $W_1$ is $$\left\lceil \log_2\left(\frac{N}{2}\right) \right\rceil.$$

The first-stage codebook set $W_1$ is the same for rank 1 and rank 2. The second-stage codebook set $W_2$ is different for rank 1 and rank 2, and the second-stage codebook set $W_2$ can be obtained from the first-stage codebook set $W_1$. How to obtain the second-stage codebook set $W_2$ will be described below.

(2) Generation of the second stage codebook set $W_2$ $W_2$ represents short-term and/or subband channel properties of 4Tx cross-polarized antenna. There are two elements which can be taken into account for a $W_2$ design, such as column selection from the codebook matrix V in $W_1$ and a co-phasing hypothesis.

The first element taken into account for a $W_2$ design is column selection. A proper DFT vector is selected from the codebook matrix V in $W_1$. For example, a column selection vector Y can be defined as $Y \in \{\tilde{e}_1, \tilde{e}_2\}$, $\tilde{e}_n$ is a 2×1 column selection vector with all zeros except for the n-th element with the value 1, $\tilde{e}_1$ represents a first column selected from the codebook matrix V, and $\tilde{e}_2$ represents a second column selected from the codebook matrix V.

The second element taken into account for a $W_2$ design is used to reflect inter-polarization phase information and can be designed similar to the DFT codebook in $W_1$ and with different quantization bits. The co-phasing information can be shown as follows:

$$c = \frac{1}{\sqrt{2}} \begin{bmatrix} 1 & e^{j\frac{2\pi n}{N}} \end{bmatrix}^T, (n = 0, 1, \ldots, N-1)$$

In summary, the second stage codebook set $W_2$ can be defined as follows according to different rank indication information:

For rank 1:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1)$$

Where $(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$.

If column selection is the same for $Y_1$ and $Y_2$, then one bit is enough to represent the column selection. The number of feedback bits for $W_2$ with rank 1 can be $\log_2(N)+1$ and $\log_2(N)+2$.

For rank 2:

$$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\}, (n = 0, 1, \ldots, N-1)$$

Where $(Y_1, Y_2, Y_3, Y_4) \in \{(\tilde{e}_i, \tilde{e}_j, \tilde{e}_k, \tilde{e}_l)\}$, i, j, k, l∈(1, 2). With $Y_3 = Y_1$ and $Y_4 = Y_2$, $$W_2 \in \left\{ \frac{1}{\sqrt{2}} \begin{bmatrix} Y_1 & Y_1 \\ Y_2 e^{j\frac{2\pi n}{N}} & -Y_2 e^{j\frac{2\pi n}{N}} \end{bmatrix} \right\}, (n = 0, 1, \ldots, N-1);$$

and
With $Y_3 = Y_2$ and $Y_4 = Y_1$, $$W_2 \in \left\{ \frac{1}{\sqrt{2}} \begin{bmatrix} Y_1 & Y_2 \\ Y_2 e^{j\frac{2\pi n}{N}} & -Y_1 e^{j\frac{2\pi n}{N}} \end{bmatrix} \right\}, (n = 0, 1, \ldots, N-1).$$

Where $(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$.

The rank-2 codebook has the same number of feedback bits $\log_2(N)+1$ and $\log_2(N)+2$ and as the rank-1 codebook for W2.

Advantageously a non-constant modulus property can be taken into account to reflect inter-polarization amplitude information, and hereupon the third element a reflecting the non-constant modulus property can be introduced to $W_2$.

Then for rank 1, $$W_2 \in \left\{ \begin{bmatrix} \alpha Y_1 \\ \sqrt{1-\alpha^2}\, Y_2 e^{j\frac{2\pi n}{N}} \end{bmatrix} \right\}, (n = 0, 1, \ldots, N-1)$$

For rank 2, $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$
$(n = 0, 1, \ldots, N-1)$ $\alpha$ is quantized in the range (0, 1):

In the event that the codebook matrix V in $W_1$ is formed of a set of adjacent overlapped DFT vectors selected from the foregoing codebook c:

A column selection vector $\tilde{e}_n$ is a 4×1 column selection vector with all zeros except for the n-th element with the value 1, which indicates the selection of the n-th column vector from the matrix V, so there are four column vector possibilities in total, $\{\tilde{e}_1, \tilde{e}_2, \tilde{e}_3, \tilde{e}_4\}$. $Y_1$ and $Y_2$ can be selected as any two of these four column vectors, so there are 16 possibilities in total.

For rank 1:

$$W_2 \in \left\{ \frac{1}{\sqrt{2}} \begin{bmatrix} \alpha Y_1 \\ \sqrt{1-\alpha^2}\, Y_2 e^{j\frac{2\pi n}{N}} \end{bmatrix} \right\}, (n = 0, 1, \ldots, N-1)$$

Where $(Y_1, Y_2) \in \{(\tilde{e}_m, \tilde{e}_k)\}$, (m=1, ... 4, k=1, ..., 4).
For rank 2, $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$
$(n = 0, 1, \ldots, N-1)$ Where
$(Y_1, Y_2, Y_3, Y_4) \in \{(\tilde{e}_i, \tilde{e}_j, \tilde{e}_k, \tilde{e}_l)\}$, (i=1, ... 4, j=1, ..., 4, k=1, ... 4, l=, ..., 4).

The two-state codebook set $W=W_1 W_2$ of the invention can be compatible backward with a Release 8 codebook. The two-state codebook set can be regarded as an improved design of the Release 8 codebook.

A method of determining a codebook from a two-state codebook set formed as above will be described below. The two-state codebook set is stored respectively at the base station side and the user equipment side.

Figure 1:
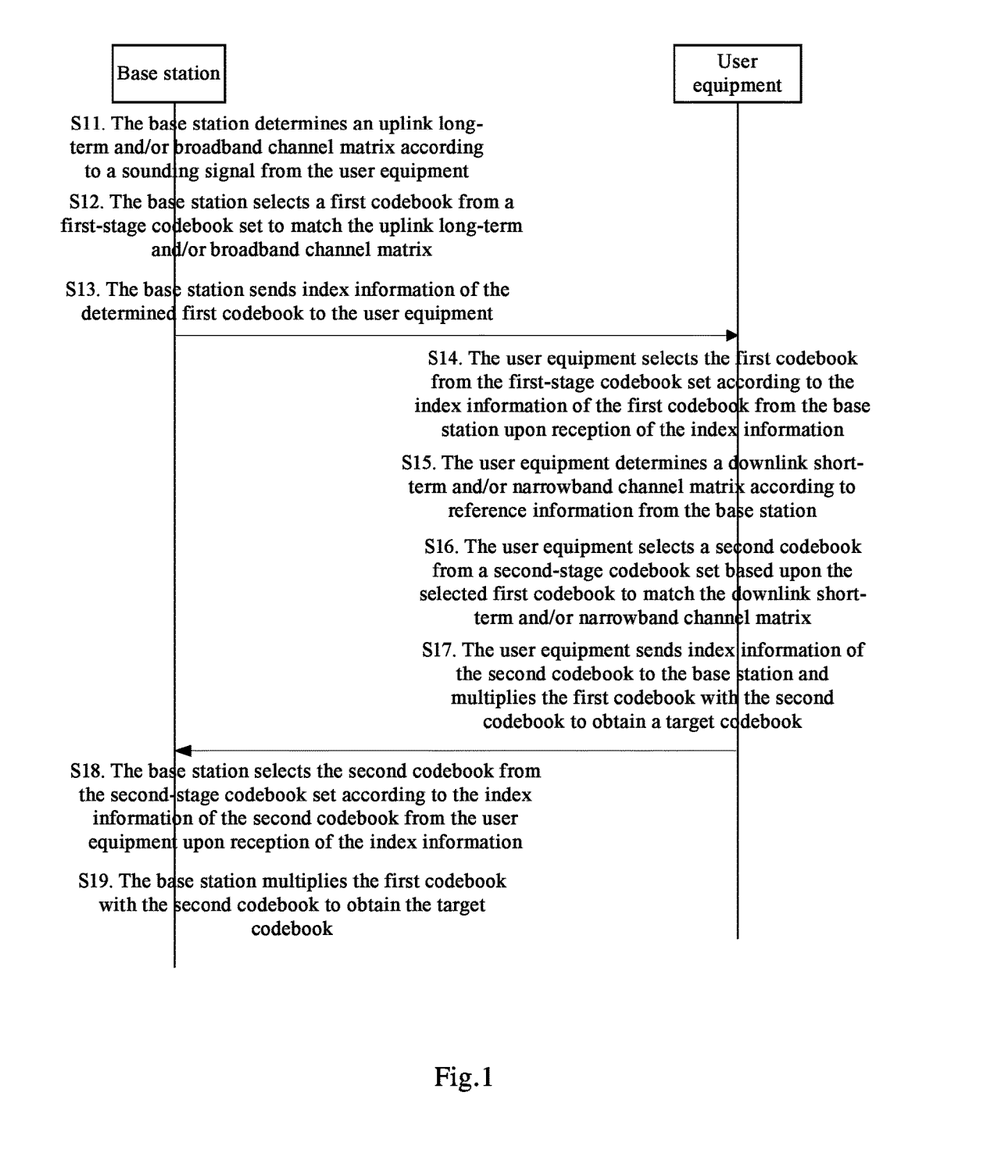
FIG. 1 is a flow chart of a method of determining a codebook in a multi-input multi-output communication system according to an embodiment of the invention.

In an embodiment, referring to FIG. 1, firstly in the step S11, a base station determines an uplink long-term and/or broadband channel matrix according to a sounding signal from a user equipment.

Then in the step S12, the base station selects a first codebook from a first-stage codebook set $W_1$ based upon the first-stage codebook set $W_1$ to match the uplink long-term and/or broadband channel matrix. For example, the base station can match the uplink long-term and/or broadband channel matrix based upon a maximum capacity or minimum distance criterion.

Next in the step S13, the base station sends index information of the determined first codebook to the user equipment.

Thus in the step S14, the user equipment selects the first codebook from the first-stage codebook set $W_1$ according to the index information of the first codebook from the base station upon reception of the index information.

Then in the step S15, the user equipment determines a downlink short-term and/or narrowband channel matrix according to reference information from the base station.

Next in the step S16, the user equipment selects a second codebook from a second-stage codebook set $W_2$ based upon the selected first codebook to match the downlink short-term and/or narrowband channel matrix. For example, the user equipment can multiply the first codebook with each codebook in the second-stage codebook set $W_2$ and select the second codebook from the second-stage codebook set $W_2$ based upon the maximum capacity or minimum distance criterion.

Thus in the step S17, the user equipment sends index information of the second codebook to the base station and multiplies the first codebook with the second codebook to obtain a target codebook.

In the step S18, the base station selects the second codebook from the second-stage codebook set $W_2$ according to the index information of the second codebook from the user equipment upon reception of the index information.

Then in the step S19, the base station multiplies the first codebook with the second codebook to obtain the target codebook.

Figure 2:
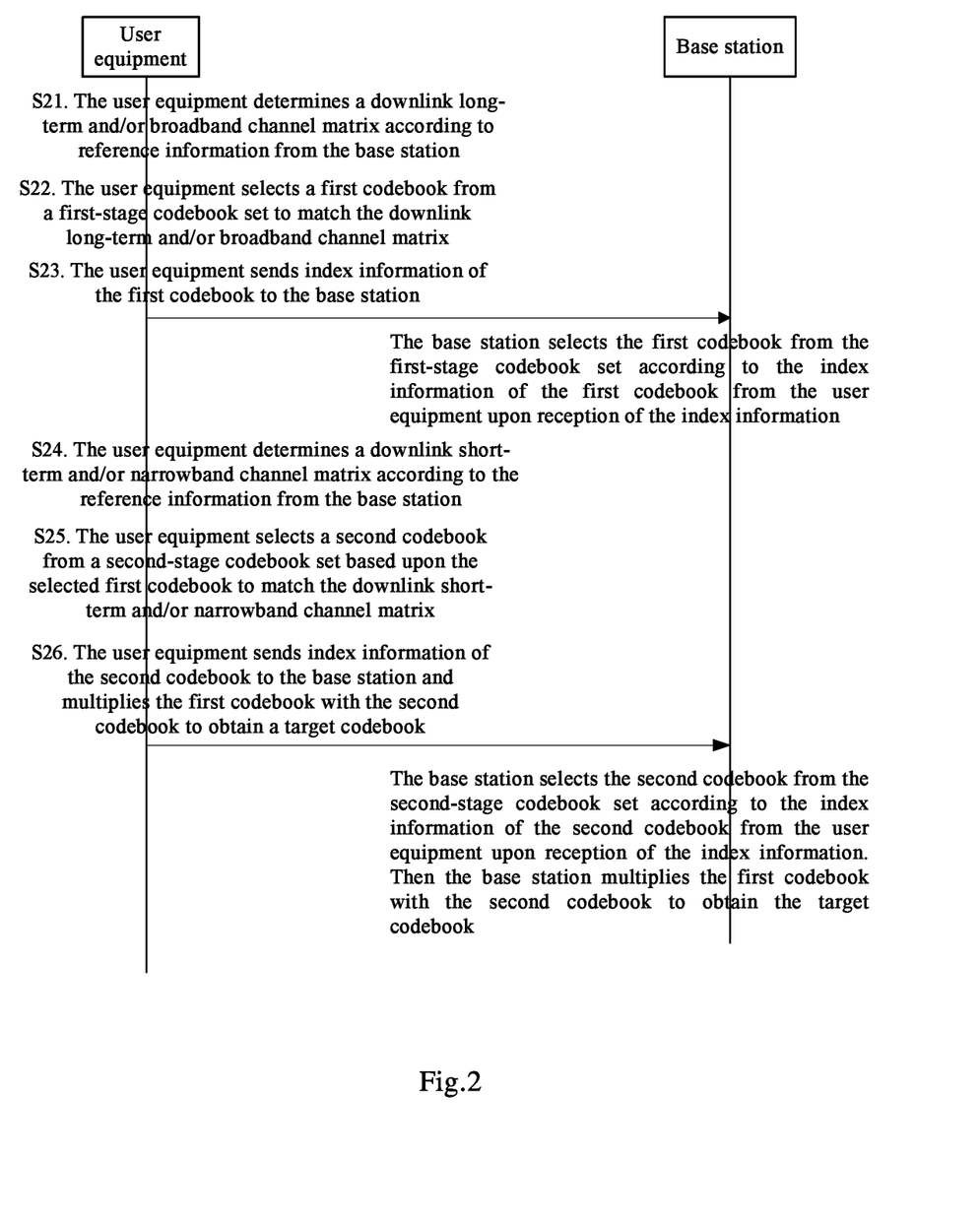
FIG. 2 is a flow chart of a method of determining a codebook in a multi-input multi-output communication system according to another embodiment of the invention.

In another embodiment, referring to FIG. 2, firstly in the step S21, a user equipment determines a downlink long-term and/or broadband channel matrix according to reference information from a base station.

Then in the step S22, the user equipment selects a first codebook from a first-stage codebook set $W_1$ to match the downlink long-term and/or broadband channel matrix. For example, the user equipment can match the downlink long-term and/or broadband channel matrix based upon a maximum capacity or minimum distance criterion.

Next in the step S23, the user equipment sends index information of the first codebook to the base station.

The base station selects the first codebook from the first-stage codebook set $W_1$ according to the index information of the first codebook from the user equipment upon reception of the index information.

Then in the step S24, the user equipment determines a downlink short-term and/or narrowband channel matrix according to the reference information from the base station.

Then in the step 25, the user equipment selects a second codebook from a second-stage codebook set $W_2$ based upon the selected first codebook to match the downlink short-term and/or narrowband channel matrix. For example, the user equipment can multiply the first codebook with each codebook in the second second-stage codebook set $W_2$ and select the second codebook from the second-stage codebook set $W_2$ based upon the maximum capacity or minimum distance criterion.

Next in the step S26, the user equipment sends index information of the second codebook to the base station and multiplies the first codebook with the second codebook to obtain a target codebook.

The base station selects the second codebook from the second-stage codebook set $W_2$ according to the index information of the second codebook from the user equipment upon reception of the index information. Then the base station multiplies the first codebook with the second codebook to obtain the target codebook.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Any reference numerals in the claims shall not be construed as limiting the scope of the invention. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. A method of generating a two-stage codebook set, the two-stage codebook set being applicable to a multi-input multi-output communication system in which a base station is configured with four cross-polarized transmit antennas, and the two-stage codebook set including a first-stage codebook set and a second-stage codebook set, wherein the method comprises:
  selecting a first codebook and a second codebook based upon information received from a user equipment; and
  multiplying the first codebook with the second codebook to obtain a target codebook, wherein the target codebook is determined by:
  generating a codebook matrix V based upon a two-antenna rank-1 DFT codebook c;
  determining the first-stage codebook set $W_1$ according to the codebook matrix V, wherein $W_1$ represents long-term and/or wideband channel properties for each antenna pair with a polarization direction in 4Tx cross-polarized antenna configuration as shown in the form $$W_1 = \begin{bmatrix} V & 0 \\ 0 & V \end{bmatrix};$$

and
  determining the two-stage codebook set $W_2$, which represents short-term and/or subband channel properties of the 4Tx cross-polarized antenna, wherein $W_2$ is at least based upon a column selection vector and inter-polarization phase information, wherein the two-stage codebook configures the 4Tx cross-polarized antenna,
  wherein the generating comprises any one of:
    selecting two orthogonal DFT vectors from the two-antenna rank-1 DFT codebook c to generate the codebook matrix V, wherein $$c = \frac{1}{\sqrt{2}} \begin{bmatrix} 1 & e^{j\frac{2\pi n}{N}} \end{bmatrix}^T, (n = 0, 1, \ldots, N-1) \text{ and}$$

$$V = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix}, \left(m = 0, 1, \ldots, \frac{N}{2} - 1\right);$$

selecting two orthogonal DFT vectors from the two-antenna rank-1 DFT codebook c to generate a codebook matrix I, wherein $$c = \frac{1}{\sqrt{2}} \begin{bmatrix} 1 & e^{j\frac{2\pi n}{N}} \end{bmatrix}^T, (n = 0, 1, \ldots, N-1) \text{ and}$$

$$I = \frac{1}{\sqrt{2}} \begin{bmatrix} 1 & 1 \\ e^{j\frac{2\pi}{N}m} & e^{j\frac{2\pi}{N}(m+\frac{N}{2})} \end{bmatrix}, \left(m = 0, 1, \ldots, \frac{N}{2} - 1\right),$$

and left-multiplying or right-multiplying the codebook matrix I by a diagonal matrix J to generate the codebook matrix V, wherein $$J = \begin{pmatrix} \rho & 0 \\ 0 & \sqrt{1-\rho^2} \end{pmatrix},$$

and $\rho$ is quantized in the range (0, 1); and
    selecting a set of adjacent overlapping DFT vectors from the two-antenna rank-1 DFT codebook c to generate the codebook matrix V, wherein $$V = \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix},$$

$$(m = 0, 2, 4, \ldots, N-2).$$

2. The method according to claim 1, wherein the determining the two-stage codebook set $W_2$ comprises:
  determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\}, (n = 0, 1, \ldots, N-1),$$

$(Y_1, Y_2, Y_3, Y_4) \in \{(\tilde{e}_i, \tilde{e}_j, \tilde{e}_k, \tilde{e}_l)\}$, i, j, k, l$\in$(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V.

3. The method according to claim 1, wherein the determining the two-stage codebook set $W_2$ comprises:
  determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2}\, Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$
$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1).

4. The method according to claim 1, wherein the determining the two-stage codebook set $W_2$ comprises:
determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2}\, Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, ... 4, k=1, ..., 4) for rank 1; and $$W_2 \in \left\{ \frac{1}{\sqrt{2}} \begin{bmatrix} \alpha Y_1 & \sqrt{1-\alpha^2}\, Y_3 \\ \sqrt{1-\alpha^2}\, Y_2 e^{j\frac{2\pi n}{N}} & -\alpha Y_4 e^{j\frac{2\pi n}{N}} \end{bmatrix} \right\},$$
$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, ... 4, j=1, ..., 4, k=1, ... 4, l=1, ..., 4) for rank 2,
wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

5. A method of determining a codebook in a base station of a multi-input multi-output communication system, the base station being configured with four cross-polarized transmit antennas, wherein the method comprises:
determining an uplink long-term and/or broadband channel matrix according to a sounding signal from a user equipment;
selecting a first codebook from a first-stage codebook set based upon the first-stage codebook set to match the uplink long-term and/or broadband channel matrix;
sending index information of the first codebook to the user equipment;
receiving index information of a second codebook from the user equipment;
selecting the second codebook from a second-stage codebook set according to the index information of the second codebook; and
multiplying the first codebook with the second codebook to obtain a target codebook,
wherein the first-stage codebook set $W_1$ and the second-stage codebook set $W_2$ are determined by:
generating a codebook matrix V based upon a two-antenna rank-1 DFT codebook c;
determining the first-stage codebook set $W_1$ According to the codebook matrix V, wherein $$W_1 = \begin{bmatrix} V & 0 \\ 0 & V \end{bmatrix};$$

and
determining the second-stage codebook set $W_2$ at least based upon a column selection vector and inter-polarization phase information, wherein the generating comprises any one of:
selecting two orthogonal DFT vectors from the two-antenna rank-1 DFT codebook c to generate the codebook matrix V, wherein $$c = \frac{1}{\sqrt{2}} \begin{bmatrix} 1 & e^{j\frac{2\pi n}{N}} \end{bmatrix}^T, (n = 0, 1, \ldots, N-1) \text{ and}$$

$$V = \frac{1}{\sqrt{2}} \begin{bmatrix} 1 & 1 \\ e^{j\frac{2\pi}{N} m} & e^{j\frac{2\pi}{N}(m+\frac{N}{2})} \end{bmatrix}, \left(m = 0, 1, \ldots, \frac{N}{2}-1\right);$$

selecting two orthogonal DFT vectors from the two-antenna rank-1 DFT codebook c to generate a codebook matrix I, wherein $$c = \frac{1}{\sqrt{2}} \begin{bmatrix} 1 & e^{j\frac{2\pi n}{N}} \end{bmatrix}^T, (n = 0, 1, \ldots, N-1) \text{ and}$$

$$I = \frac{1}{\sqrt{2}} \begin{bmatrix} 1 & 1 \\ e^{j\frac{2\pi}{N} m} & e^{j\frac{2\pi}{N}(m+\frac{N}{2})} \end{bmatrix}, \left(m = 0, 1, \ldots \frac{N}{2}-1\right),$$

and left-multiplying or right-multiplying the codebook matrix I by a diagonal matrix J to generate the codebook matrix V, wherein $$J = \begin{pmatrix} \rho & 0 \\ 0 & \sqrt{1-\rho^2} \end{pmatrix},$$

and ρ is quantized in the range (0, 1); and
selecting a set of adjacent overlapping DFT vectors from the two-antenna rank-1 DFT codebook c to generate the codebook matrix V, wherein $$V = \begin{bmatrix} 1 & 1 & 1 & 1 \\ e^{j\frac{2\pi}{N} m} & e^{j\frac{2\pi}{N}(m+1)} & e^{j\frac{2\pi}{N}(m+2)} & e^{j\frac{2\pi}{N}(m+3)} \end{bmatrix},$$

$(m = 0, 2, 4, \ldots, N-2).$

6. The method according to claim 5, wherein the second-stage codebook set $W_2$ is determined by any one of:

determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V;

determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1); and determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, . . . 4, k=1, . . . , 4) for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, . . . 4, j=1, . . . , 4, k=1, . . . 4, l=1, . . . , 4) for rank 2, wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

7. A method of determining a codebook in a user equipment of a multi-input multi-output communication system, wherein the method comprises:

receiving index information of a first codebook from a base station;

selecting the first codebook from a first-stage codebook set according to the index information of the first codebook;

determining a downlink short-term and/or narrowband channel matrix according to reference information from the base station;

selecting a second codebook from a second-stage codebook set based upon the first codebook to match the downlink short-term and/or narrowband channel matrix; and sending index information of the second codebook to the base station and multiplying the first codebook with the second codebook to obtain a target codebook, wherein the first-stage codebook set $W_1$ and the second-stage codebook set $W_2$ are determined by:

generating a codebook matrix V based upon a two-antenna rank-1 DFT codebook c;

determining the first-stage codebook set $W_1$ according to the codebook matrix V, wherein $$W_1 = \begin{bmatrix} V & 0 \\ 0 & V \end{bmatrix};$$

and determining the second-stage codebook set $W_2$ at least based upon a column selection vector and inter-polarization phase information, wherein determining the second-stage codebook set $W_2$ is determined by any one of:

determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\}, (n = 0, 1, \ldots, N-1),$$

$(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V;

determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$
$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1); and determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, ... 4, k=1, ..., 4) for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$
$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, ... 4, j=1, ..., 4, k=1, ... 4, l=1, ..., 4) for rank 2,
wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

8. The method according to claim 7, wherein the selecting comprises:
multiplying the first codebook with each codebook in the second-stage codebook set and selecting the second codebook from the second-stage codebook set based upon a maximum capacity or minimum distance criterion.

9. A method of determining a codebook in a user equipment of a multi-input multi-output communication system, wherein the method comprises:
determining a downlink long-term and/or broadband channel matrix according to reference information from a base station;
selecting a first codebook from a first-stage codebook set to match the downlink long-term and/or broadband channel matrix;
sending index information of the first codebook to the base station;
determining a downlink short-term and/or narrowband channel matrix according to the reference information from the base station;
selecting a second codebook from a second-stage codebook set based upon the first codebook to match the downlink short-term and/or narrowband channel matrix; and
sending index information of the second codebook to the base station, and multiplying the first codebook with the second codebook to obtain a target codebook,
wherein the first-stage codebook set $W_1$ and the second-stage codebook set $W_2$ are determined by:
generating a codebook matrix V based upon a two-antenna rank-1 DFT codebook c;
determining the first-stage codebook set $W_1$ according to the codebook matrix V, wherein $$W_1 = \begin{bmatrix} V & 0 \\ 0 & V \end{bmatrix};$$

and
determining the second-stage codebook set $W_2$ at least based upon a column selection vector and inter-polarization phase information, wherein the codebook matrix V is generated by any one of:
selecting two orthogonal DFT vectors from the two-antenna rank-1 DFT codebook c to generate the codebook matrix V, wherein $$c = \frac{1}{\sqrt{2}} \begin{bmatrix} 1 & e^{j\frac{2\pi n}{N}} \end{bmatrix}^T, (n = 0, 1, \ldots, N-1)$$

and $$V = \frac{1}{\sqrt{2}} \begin{bmatrix} 1 & 1 \\ e^{j\frac{2\pi}{N}m} & e^{j\frac{2\pi}{N}\left(m+\frac{N}{2}\right)} \end{bmatrix}, \left(m = 0, 1, \ldots, \frac{N}{2}-1\right);$$

selecting two orthogonal DFT vectors from the two-antenna rank-1 DFT codebook c to generate a codebook matrix I, wherein $$c = \frac{1}{\sqrt{2}} \begin{bmatrix} 1 & e^{j\frac{2\pi n}{N}} \end{bmatrix}^T, (n = 0, 1, \ldots, N-1)$$

and $$I = \frac{1}{\sqrt{2}} \begin{bmatrix} 1 & 1 \\ e^{j\frac{2\pi}{N}m} & e^{j\frac{2\pi}{N}\left(m+\frac{N}{2}\right)} \end{bmatrix}, \left(m = 0, 1, \ldots, \frac{N}{2}-1\right),$$

and left-multiplying or right-multiplying the codebook matrix I by a diagonal matrix J to generate the codebook matrix V, wherein $$J = \begin{pmatrix} \rho & 0 \\ 0 & \sqrt{1-\rho^2} \end{pmatrix},$$

and ρ is quantized in the range (0, 1); and selecting a set of adjacent overlapping DFT vectors from the two-antenna rank-1 DFT codebook c to generate the codebook matrix V, wherein $$V = \begin{bmatrix} 1 & 1 & 1 & 1 \\ e^{j\frac{2\pi}{N}m} & e^{j\frac{2\pi}{N}(m+1)} & e^{j\frac{2\pi}{N}(m+2)} & e^{j\frac{2\pi}{N}(m+3)} \end{bmatrix},$$

$(m = 0, 2, 4, \ldots, N-2).$

10. The method according to claim 9, wherein the second-stage codebook set $W_2$ is determined by any one of:

determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V;

determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1); and determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, . . . 4, k=1, . . . , 4) for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, . . . 4, j=1, . . . , 4, k=1, . . . 4, l=1, . . . , 4) for rank 2, wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

11. The method according to claim 9, wherein the selecting comprises:

multiplying the first codebook with each codebook in the second-stage codebook set and selecting the second codebook from the second-stage codebook set based upon a maximum capacity or minimum distance criterion.

12. A method of determining a codebook in a base station of a multi-input multi-output communication system, the base station being configured with four cross-polarized transmit antennas, wherein the method comprises:

receiving index information of a first codebook from a user equipment;

selecting the first codebook from a first-stage codebook set according to the index information of the first codebook;

receiving index information of a second codebook from the user equipment;

selecting the second codebook from a second-stage codebook set according to the index information of the second codebook; and multiplying the first codebook with the second codebook to obtain a target codebook, wherein the first-stage codebook set $W_1$ and the second-stage codebook set $W_2$ are determined by:

generating a codebook matrix V based upon a two-antenna rank-1 DFT codebook c;

determining the first-stage codebook set $W_1$ according to the codebook matrix V, wherein $$W_1 = \begin{bmatrix} V & 0 \\ 0 & V \end{bmatrix};$$

and
determining the second-stage codebook set $W_2$ at least based upon a column selection vector and inter-polarization phase information, wherein the second-stage code book set $W_2$ is determined by any one of:
determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\}, (n = 0, 1, \ldots, N-1),$$

$(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V;
determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$
$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and α is quantized in the range (0, 1); and
determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, . . . 4, k=1, . . . , 4) for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\},$$
$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, . . . 4, j=1, . . . , 4, k=1, . . . 4, l=1, . . . , 4) for rank 2, wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and α is quantized in the range (0, 1).

13. A method of generating a two-stage codebook set, the two-stage codebook set being applicable to a multi-input multi-output communication system in which a base station is configured with four cross-polarized transmit antennas, and the two-stage codebook set including a first-stage codebook set and a second-stage codebook set, wherein the method comprises:
selecting a first codebook and a second codebook based upon information received from a user equipment; and
multiplying the first codebook with the second codebook to obtain a target codebook, wherein the target codebook is determined by:
generating a codebook matrix V based upon a two-antenna rank-1 DFT codebook c;
determining the first-stage codebook set $W_1$ according to the codebook matrix V, wherein $W_1$ represents long-term and/or wideband channel properties for each antenna pair with a polarization direction in 4Tx cross-polarized antenna configuration as shown in the form $$W_1 = \begin{bmatrix} V & 0 \\ 0 & V \end{bmatrix};$$

and
determining the two-stage codebook set $W_2$, which represents short-term and/or subband channel properties of the 4Tx cross-polarized antenna, wherein $W_2$ is at least based upon a column selection vector and inter-polarization phase information, wherein the two-stage codebook configures the 4Tx cross-polarized antenna, wherein the determining the two-stage codebook set $W_2$ includes:
determining the two-stage codebook set $W_2$ based upon the column selection vector and the inter-polarization phase information in the formula of:

$$W_2 \in \left\{ \frac{1}{\sqrt{2}} \begin{bmatrix} Y_1 \\ Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} Y_1 & Y_3 \\ Y_2 e^{j\frac{2\pi n}{N}} & -Y_4 e^{j\frac{2\pi n}{N}} \end{bmatrix} \right\}, (n = 0, 1, \ldots, N-1),$$

$(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, and $\tilde{e}_2$ represents a second column selected from the codebook matrix V.

14. A method of generating a two-stage codebook set, the two-stage codebook set being applicable to a multi-input multi-output communication system in which a base station is configured with four cross-polarized transmit antennas, and the two-stage codebook set including a first-stage codebook set and a second-stage codebook set, wherein the method comprises:

selecting a first codebook and a second codebook based upon information received from a user equipment; and multiplying the first codebook with the second codebook to obtain a target codebook, wherein the target codebook is determined by:

generating a codebook matrix V based upon a two-antenna rank-1 DFT codebook c;

determining the first-stage codebook set $W_1$ according to the codebook matrix V, wherein $W_1$ represents long-term and/or wideband channel properties for each antenna pair with a polarization direction in 4Tx cross-polarized antenna configuration as shown in the form $$W_1 = \begin{bmatrix} V & 0 \\ 0 & V \end{bmatrix};$$

and determining the two-stage codebook set $W_2$, which represents short-term and/or subband channel properties of the 4Tx cross-polarized antenna, wherein $W_2$ is at least based upon a column selection vector and inter-polarization phase information, wherein the two-stage codebook configures the 4Tx cross-polarized antenna, wherein the determining the two-stage codebook set $W_2$ includes:

determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_1, \tilde{e}_1), (\tilde{e}_2, \tilde{e}_2), (\tilde{e}_1, \tilde{e}_2), (\tilde{e}_2, \tilde{e}_1)\}$ for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, i, j, k, l∈(1, 2) for rank 2, wherein $\tilde{e}_n$ represents a 2×1 selection vector in which all other elements than an n-th element being 1 are 0, $\tilde{e}_1$ represents a first column selected from the codebook matrix V, $\tilde{e}_2$ represents a second column selected from the codebook matrix V, and $\alpha$ is quantized in the range (0, 1).

15. A method of generating a two-stage codebook set, the two-stage codebook set being applicable to a multi-input multi-output communication system in which a base station is configured with four cross-polarized transmit antennas, and the two-stage codebook set including a first-stage codebook set and a second-stage codebook set, wherein the method comprises:

selecting a first codebook and a second codebook based upon information received from a user equipment; and multiplying the first codebook with the second codebook to obtain a target codebook, wherein the target codebook is determined by:

generating a codebook matrix V based upon a two-antenna rank-1 DFT codebook c;

determining the first-stage codebook set $W_1$ according to the codebook matrix V, wherein $W_1$ represents long-term and/or wideband channel properties for each antenna pair with a polarization direction in 4Tx cross-polarized antenna configuration as shown in the form $$W_1 = \begin{bmatrix} V & 0 \\ 0 & V \end{bmatrix};$$

and determining the two-stage codebook set $W_2$, which represents short-term and/or subband channel properties of the 4Tx cross-polarized antenna, wherein $W_2$ is at least based upon a column selection vector and inter-polarization phase information, wherein the two-stage codebook configures the 4Tx cross-polarized antenna, wherein the determining the two-stage codebook set $W_2$ includes:

determining the two-stage codebook set $W_2$ based upon the column selection vector, the inter-polarization phase information and inter-polarization amplitude information in the formula of:

$$W_2 \in \left\{ \frac{1}{\sqrt{2}} \begin{bmatrix} \alpha Y_1 \\ \sqrt{1-\alpha^2} Y_2 e^{j\frac{2\pi n}{N}} \end{bmatrix} \right\}, (n = 0, 1, \ldots, N-1),$$

$(Y_1, Y_2) \in \{(\tilde{e}_m, \tilde{e}_k)\}$, (m=1, ... 4, k=1, ..., 4) for rank 1; and $$W_2 \in \left\{ \frac{1}{\sqrt{2}} \begin{bmatrix} \alpha Y_1 & \sqrt{1-\alpha^2} Y_3 \\ \sqrt{1-\alpha^2} Y_2 e^{j\frac{2\pi n}{N}} & -\alpha Y_4 e^{j\frac{2\pi n}{N}} \end{bmatrix} \right\},$$

$(n = 0, 1, \ldots, N-1),$ $(Y_1, Y_2, Y_3, Y_4) \in \{(\tilde{e}_i, \tilde{e}_j, \tilde{e}_k, \tilde{e}_l)\}$, (i=1, ..., 4, j=1, ..., 4, k=1, ..., 4, l=1, ..., 4) for rank 2, wherein $\tilde{e}_n$ represents a 4×1 selection vector in which all other elements than an n-th element being 1 are 0, $\tilde{e}_1$ represents a first column selected from the codebook matrix V, $\tilde{e}_2$ represents a second column selected from the codebook matrix V, $\tilde{e}_3$ represents a third column selected from the codebook matrix V, $\tilde{e}_4$ represents a fourth column selected from the codebook matrix V, and $\alpha$ is quantized in the range (0, 1).

* * * * *